455-604 AU 233 EX
FIP8106 XR 2,662,169
OSS REFERENCE
EXAMINER

Dec. 8, 1953 C. ZWIKKER 2,662,169

APPARATUS FOR TRANSMITTING AND RECEIVING LIGHT SIGNALS

Filed Feb. 21, 1950

INVENTOR.
Cornelis Zwikker
BY Fred M Vogel
AGENT

Patented Dec. 8, 1953 2,662,169

UNITED STATES PATENT OFFICE 2,662,169

APPARATUS FOR TRANSMITTING AND RECEIVING LIGHT SIGNALS

Cornelis Zwikker, Eindhoven, Netherlands, assignor to Hartford National Bank and Trust Company, Hartford, Conn., as trustee Application February 21, 1950, Serial No. 145,340

Claims priority, application Netherlands February 25, 1949

1 Claim. (Cl. 250—7)

This invention relates to apparatus for transmitting and receiving light signals and more particularly to apparatus for use on airfields having ground lighting serving to make visible the situation of the field, the runways and obstacles, and to devices intended for use in aircraft for the observation of the said ground lighting. The devices may also be designed to transmit light signals between other sites, for example between a site at a coastal position and one on a ship, or for beacon channels.

The reception of such light signals is rendered more difficult as interfering light sources, such as daylight, moonlight or artificial light sources become stronger or as the atmosphere becomes less clear, for example owing to clouds, fog or rain. The reception is impaired partly by diminution of visual sensitivity on account of the interfering light and partly by absorption of the light owing to clouds and the like.

The principal object of the invention is to minimize the influence of such interferences and to facilitate the reception of signals. The invention is based on recognition of the fact that it is possible to reduce or completely eliminate the influence of the interfering light by concentrating the light signals within very short time-intervals and screening the eye between the intervals.

The system according to the invention comprises a device for transmitting intermittent light signals of very short duration and a device for the reception thereof comprising an obturator which is adapted to open in synchronism with the intermittent light signals.

In one preferred embodiment of the invention the light emitter is coupled with a radio transmitter operating in synchronism with the light transmitter, the light receiver being coupled with a radio receiver which opens an obturator in synchronism and in phase with the light transmitter. In a further embodiment, the receiver is coupled with a radio transmitter which emits signals upon opening of the obturator, these signals controlling the light transmitter.

In the system according to the invention, the meantime during which the obturator is open is considerably shorter than the time during which it is closed, for example 10 or 100 times shorter. When using quick-operating flash-light lamps, this ratio may readily be increased to $\frac{1}{1000}$.

In order that the invention may be more clearly understood and readily carried into effect, it will now be described more fully with reference to the accompanying drawing, wherein.

Figure 1:
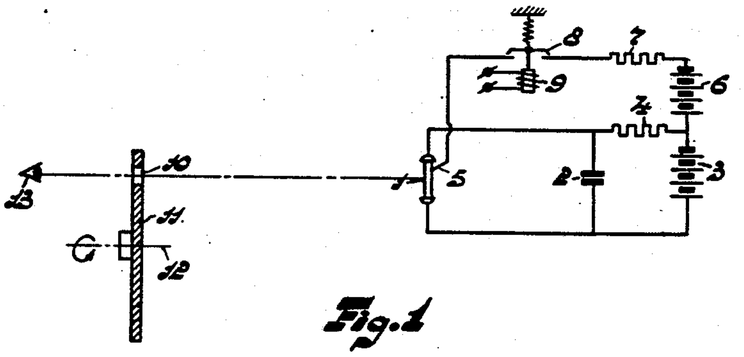
Fig. 1 shows a system according to the invention comprising a light transmitter and receiver.

In these examples it is assumed that an airfield is provided with a light emitter and that the receiver is arranged in an aeroplane. The airfield is equipped with a number of flash-light lamps 1, one of which is shown in Fig. 1. Such a lamp is fed by a condenser 2, which is charged by a source of current 3 through a resistance 4. The lamp may be ignited by connecting an ignition electrode 5 to a voltage source 6 through a resistance 7 and a switch 8 comprising a control coil 9, which can be periodically energized by any suitable device for this purpose.

The circuit of the lamp is shown only diagrammatically: it may be replaced by any other arrangement providing short light flashes of high intensity. The frequency of the energisation is not critical and may be very low, provided that it is sufficient to give the observer in the aeroplane a correct impression of the positioning of the lamps, but if it is desired for the observer to observe a continuous image, the frequency may be higher, for example from 25 to 50 cycles/sec. Figure 1 shows a mechanical switch, although, as a rule, it is preferable to utilise an electric switch, for example a controlled, gaseous discharge tube.

At the receiving end, in the aeroplane, an obturator in the form of a disc 11 having one or more apertures 10 is provided on a shaft 12, which is driven by a motor (not shown) in such manner that the apertures 10 allow passage of the light to the eye 13 of the observer at the moments of ignition of the flash-light lamps 1. The duration of the passage of light is preferably chosen to be as short as possible, i. e. approximately as short as the time during which the flash-light lamps emit light, for example about $10^{-4}$ second. Even if the obturator is open a great many times per second, for example 50 times, only $(50)10^{-4}$ part of the interfering light is passed and 99.5% of this light is eliminated. Thus, even if the time of opening of the obturator is chosen to be relatively long thereby reducing the requirements as regards the synchronism between light transmitter and obturator, it is found nevertheless that a very great part of the interfering light can be neutralised.

Synchronisation of the obturator in the receiver relative to the light emitter may be effected in various ways. It is possible to control the two frequencies accurately, but separately by the same frequency, for example with the use of a quartz crystal or a tuning fork, and to make adjustable the phase of either of them, for example that of the receiver. The phase of the transmitter may be made adjustable but in this case the observer must be able to indicate to the transmitter the phase equality at which the light signals are received with greatest clarity. In this case, however, the frequency must be maintained comparatively constant, especially should it be desired that the observer see the signals for a considerable time without the need for subsequent synchronisation.

Synchronisation may, if necessary, be effected with the use of the light signals themselves, which at the receiving end may act upon a photo-electric cell and which are subsequently used as electric signals for synchronisation in a manner similar to that used, for example, in television.

However, synchronisation may, as an alternative, be effected by radio means. This case is shown diagrammatically in Fig. 2. At the transmitting end there is arranged a radio transmitter 14, which emits signals intercepted by a radio receiver 15 in an aeroplane, which after amplification of the signals, drives a motor 16, coupled to shaft 12 of the obturator. The transmitter furthermore comprises a pair of terminals 17, coupled to coil 9 of switch 8 of the light emitter to supply an energizing current thereto.

Figure 3:
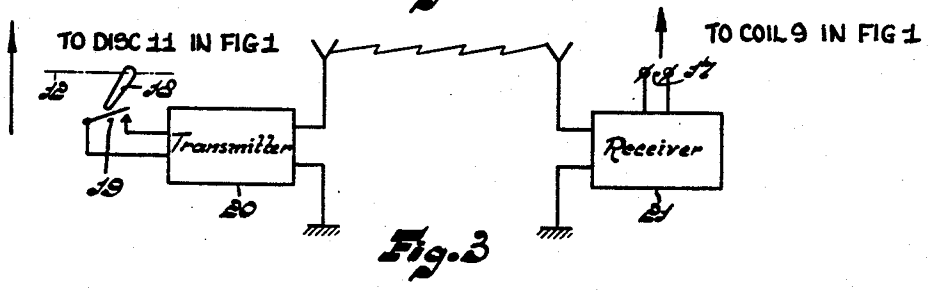

In order to minimize the load in the aeroplane, it may be advisable to control the light emitter from the aeroplane in the manner shown diagrammatically in Fig. 3. In this case the shaft 12 of the obturator, which may be driven in any arbitrary manner, carries a cam 18, which is adapted to close a switch 19. Of course, a plurality of cams may be provided, according to the number of apertures 10 in the disc 11. The switch 19 controls a transmitter 20, the signals of which are received by a receiver 21 disposed at the airfield and passing these signals, after having been amplified, to the switch 8 by way of the terminals 17.

Figure 2:
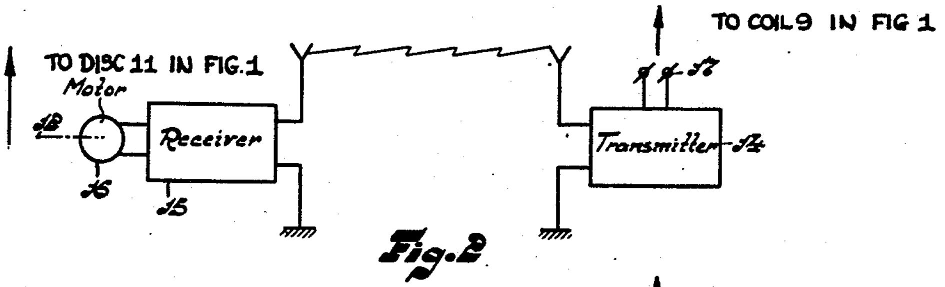
Figs. 2 and 3 show the radio transmitter and receiver for use with this system.

The arrangement last described has the advantage that the flash-light lamps may be ignited substantially without mechanical delay after the radio signal has been received, which is not realized or realized only with difficulty in the embodiment of Fig. 2. The transmitter 20 may be the transmitter normally provided in an aeroplane.

The obturator need not be opened at a constant frequency, if care is taken to ensure that the flash-light lamps are ignited substantially simultaneously with the opening of the obturator.

The arrangement described is, in general, particularly adapted for the transmission of such light signals as characterize the situation of one or more light sources, as has been shown in the embodiments. This applies more particularly to the example shown in Figs. 2 and 3. It would be of little use to employ the light signals for the transmission of messages, since this may take place by means of the radio transmitter which is already available.

However, if the frequencies of the light transmitter and receiver are controlled separately, as in the embodiment shown in Fig. 1, the device may also be used with advantage for the transmission of messages by means of light signals, since in this case, after the transmitter and the receiver have been brought into phase with one another, various series of light pulses may be transmitted. During the intervals between the light pulses, the obturator opens intermittently, but the total amount of interfering light thus striking the eye of the observer, is nevertheless only very small.

Figure 4:
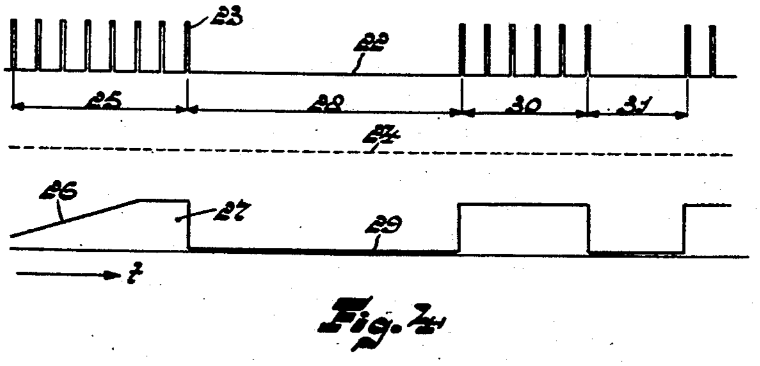
Fig. 4 shows the manner in which light signals can be transmitted and received with the use of this system.

In Fig. 4, curve 22 shows a number of pulses 23 emitted by the light transmitter. The solid segments in line 24 indicate the instants during which the obturator in the receiver is open. It is assumed that the time-interval 25 is used for adjusting the phase of the receiver. The luminous impression of the observer, indicated by line 26, increases to a maximum at 27. During the subsequent time interval 28, the transmitter is switched off and only a very small amount of interfering light 29 reaches the observer (the real proportions are drastically exaggerated in this figure for the sake or clearness). Subsequently the transmitter may emit dots and dashes in the normal way for example during time intervals 30 and 31, each of which is composed of a series of short pulses. If, as is assumed here, the frequency of these pulses is sufficiently high, for example higher than 25 c./sec., they will produce a continuous light impression with the observer. However, it is of course also possible to transmit messages with the use of separate pulses.

Such a system for the transmission of signals is, for example, very suitable for communication in cases in which radio communication is not desirable, such as, for example, between ships in war time. Such a system may furthermore be used for beacons or buoying in fairways. In this case the receiver is installed on board a ship. Synchronisation may be effected in a manner similar to that in the above embodiments.

What I claim is:

A system for transmitting and receiving light signals comprising a light emitter disposed at a first point, energizing means coupled to said emitter for energizing same intermittently to produce light signals of relatively short duration, means disposed at a point remote from said first point to receive said light signals including an obturator opening periodically, a radio transmitter coupled to said obturator for transmitting periodic radio signals in synchronism with said periodic opening, and a radio receiver responsive to said radio signals and coupled to said energising means to actuate same in synchronism with the received radio signals, whereby the disposition of said first point relative to the remote point may be determined.

CORNELIS ZWIKKER.

References Cited in the file of this patent

UNITED STATES PATENTS

| Number | Name | Date |
|---|---|---|
| 1,184,783 | Speed | May 30, 1916 |
| 1,356,686 | Arnold | Oct. 26, 1920 |
| 1,525,783 | Trenor | Feb. 10, 1925 |
| 1,919,888 | Hough | July 25, 1933 |
| 2,072,455 | Kannenberg | Mar. 2, 1937 |
| 2,131,888 | Harris | Oct. 4, 1938 |
| 2,237,193 | Mobsby | Apr. 1, 1941 |
| 2,272,102 | Wildman | Feb. 3, 1942 |
| 2,377,376 | Russell et al. | June 5, 1945 |
| 2,419,978 | Wildman | May 6, 1947 |